United States Patent Office 2,810,712
Patented Oct. 22, 1957

2,810,712

UNSATURATED ESTERS OF POLY-HALOGEN-CONTAINING DICARBOXYLIC ACIDS AND POLYMERS THEREOF

Charles F. Baranauckas, Niagara Falls, N. Y., assignor to Hooker Electrochemical Company, Niagara Falls, N. Y., a corporation of New York No Drawing. Application September 10, 1952, Serial No. 308,945

5 Claims. (Cl. 260—78.4)

This invention relates to a new chemical compound and more particularly to a new unsaturated diester of a poly-halogen-containing unsaturated dicarboxylic acid. The invention is also concerned with the new compound when in the polymerized state. More particularly, this invention relates to the diallyl ester of 1,4,5,6,7,7-hexachlorobicyclo-(2.2.1)-5-heptene-2,3-dicarboxylic acid or acid anhydride, to methods for its preparation, and to polymerized diallyl 1,4,5,6,7,7-hexachlorobicyclo-(2.2.1)-5-heptene-2,3-dicarboxylate.

The diallyl 1,4,5,6,7,7 - hexachlorobicyclo - (2.2.1)-5-heptene-2,3-dicarboxylate of this invention may be represented by the following structural formula:

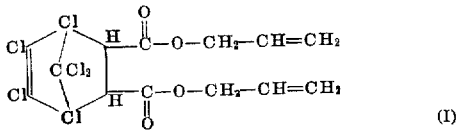

and can be prepared in accordance with this invention by effecting the esterification of 1,4,5,6,7,7-hexachlorobicyclo-(2.2.1)-heptene-2,3-dicarboxylic acid or acid anhydride with allyl alcohol presumably in accordance with the following equation:

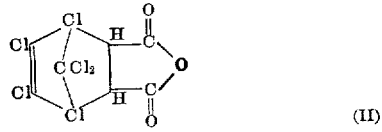

The 1,4,5,6,7,7-hexachlorobicyclo-(2.2.1)-5-heptene-2,3-dicarboxylic acid or acid anhydride employed in the foregoing reaction may be prepared by effecting a Diels-Alder reaction of hexachlorocyclopentadiene with maleic anhydride.

The monomeric product of this invention can be polymerized to an insoluble, infusible resin by heating in the presence of a catalyst to cause the formation of the homo-polymeric diallyl 1,4,5,6,7,7 - hexachlorobicyclo-(2.2.1)-5-heptene-2,3-dicarboxylate of this invention, which is a particularly useful material in that it is a clear, transparent, insoluble, infusible, flame-retardant "contact resin," that is, one which can be set or cured without the necessity of applying pressure. The monomer is also useful in copolymerization, particularly, as a cross-linking agent in making infusible, insoluble polyester resins. Still other uses for the materials of this invention are contemplated as will be more fully described hereinafter.

The following examples are illustrative of this invention, however, they are not to be construed as limiting except as defined in the claims appended hereto.

*Example 1*

One hundred and ninety-five grams of 1,4,5,6,7,7-hexachlorobicyclo - (2.2.1) - 5 - heptene - 2,3-dicarboxylic acid and allyl alcohol and benzene were charged into an esterification still provided with a refluxing condenser, water separator, heating means, etc. Three milliliters of concentrated sulfuric acid were added to the reaction mixture and there was an immediate formation of a brown color on addition of the acid. The reaction mixture was refluxed for 75 hours at a reflux temperature of about 90 degrees centigrade. At the end of the reflux period about 15 milliliters of water was removed from the water separator. The reaction mixture remaining in the esterification still was cooled, then washed thoroughly with water to remove any unreacted allyl alcohol and the sulfuric acid catalyst. The organic layer, which was dark brown in color, was separated and dried over anhydrous calcium chloride. Benzene was removed from the dried reaction mixture by heating on a steam bath for six hours. The resultant product, which weighed 150 grams, was a viscous fluid, had the appearance of a slurry, and was found to be composed of both the monoallyl and diallyl esters of 1,4,5,6,7,7-hexachlorobicyclo-(2.2.1)-5-heptene-2,3-dicarboxylic acid. Distillation at a vapor temperature up to 175 degrees centigrade under 1.5 millimeters mercury pressure yielded a semi-solid gelled polymer of the reaction mixture.

*Example 2*

One thousand and eighty-four grams of 1,4,5,6,7,7-hexachlorobicyclo-(2.2.1)-5-heptene-2,3-dicarboxylic acid anhydride, one thousand milliliters of benzene and 5,577 grams of allyl alcohol were refluxed at a reflux temperature of about 90 degrees centigrade in an esterification still until the azeotrope began to distill over. At this time about 50 grams of para-toluene sulfonic acid was added to the reaction mixture and the separation of water by azeotropic distillation was continued until the free acid content of the reaction mixture became less than 2.0 percent. The reaction mixture was then washed with water several times to remove unreacted allyl alcohol and any water soluble materials. It was then washed with an aqueous solution of five percent by weight sodium hydroxide to remove any half-ester which may have been formed during the esterification, and to ensure removal of water soluble materials. The resultant material was rewashed with water and dried over Drierite. The dried reaction mixture was subjected to a temperature of 100 degrees centigrade under one to two millimeters of mercury pressure in order to remove benzene, and any diallyl ether or other low boiling materials. This "topped" product was distilled in a semi-molecular still at 150 to 300 microns mercury pressure. A practically water-white substantially odorless liquid was recovered which analyzed for the diallyl ester of 1,4,5,6,7,7-hexachlorobicyclo-(2.2.1)-5-heptene-2,3-dicarboxylic acid anhydride as follows:

| | Found | Theory |
|---|---|---|
| Percent Chlorine | 45.8 | 45.4 |
| Percent Hydrolyzable Chlorine | 0.2 | |
| Boiling Point, ° C. at 0.12 mm. Hg | 129–132 | |
| Refractive Index, 20° C./25° C | 1.5357–1.5362 | |
| Saponification Number | 238–242 | 239.1 |
| Percent Free Acid | 0.03–0.15 | |
| Specific Gravity at 25° C./15.5° C | 1.486 | |

*Example 3*

One thousand one hundred and thirteen grams of 1,4,5,6,7,7 - hexachlorobicyclo - (2.2.1) - 5 - heptene-2,3-dicarboxylic acid anhydride, 5,577 grams of allyl alcohol, 50 grams of para-toluene sulfonic acid monohydrate, and 1,000 milliliters of benzene were charged to an esterification apparatus equipped to remove water continuously by azeotropic distillation. The reaction was run until the free acid content of the mixture expressed as allyl acid of 1,4,5,6,7,7-hexachlorobicyclo-(2.2.1)-

5-heptene-2,3-dicarboxylate was less than two percent. The reaction mixture was washed with water to remove allyl alcohol and leave an oily layer of the diester in solution with benzene and diallyl ether. The mixture was washed with five percent aqueous caustic to remove the esterification catalyst and any acid ester present. The resulting mixture was washed with water and then topped in a simple still to a body temperature of 100 degrees centigrade under one millimeter mercury pressure in order to remove any benzene and diallyl ether. The topped crude diester was then distilled in a semi-molecular still under 0.12 to 0.24 millimeter mercury pressure and a body temperature of 158 to 175 degrees centigrade. The fraction distilling at 129 to 132 degrees centigrade was collected and amounted to 913 grams. This represents about a 65 percent yield of diallyl 1,4,5,6,7,7-hexachlorobicyclo - (2.2.1)-5-heptene-2,3 - dicarboxylate. The product possesses the following properties:

|  | Found | Theory |
|---|---|---|
| Percent Chlorine | 45.8 | 45.4 |
| Percent Hydrolyzable Chlorine | 0.2 or less |  |
| Boiling Point, ° C. at 0.12 mm. Hg | 129–132 |  |
| Refractive Index, 20° C./25° C | 1.5360 |  |
| Saponification Number | 238 | 239.1 |
| Percent Free Acid | 0.05 |  |
| Specific Gravity at 25° C./15.5° C | 1.486 |  |

Another method for preparing the monomeric compound of this invention is illustrated in the following example.

*Example 4*

Four hundred and fifty-four grams of dimethyl 1,4,5,6,7,7 - hexachlorobicyclo - (2.2.1) - 5 - heptene-2,3-dicarboxylate, prepared by effecting the esterification of one mol of 1,4,5,6,7,7-hexachlorobicyclo-(2.2.1)-5-heptene-2,3-dicarboxylic acid with two mols of methanol, 580 grams of allyl alcohol and three grams of magnesium ribbon dipped in mercury were charged into an esterification still. The dimethyl 1,4,5,6,7,7-hexachlorobicyclo-(2.2.1)-5-heptene-2,3-dicarboxylate and the allyl alcohol were both dried thoroughly over sodium sulfate before being charged into the still. The reaction mixture was heated to a temperature of 96 to 100 degrees centigrade whereupon methyl alcohol was removed from the top of the fractionation column. The reaction was continued for eight and one-half hours at the end of which time little or no additional methyl alcohol was being removed. The color of the reaction mixture was pale light tan. After acidification with hydrochloric acid, the reaction mixture was washed thoroughly with water several times. The washed product which weighed 472 grams was distilled in a semi-molecular still under 60 to 120 microns mercury pressure to yield 396 grams of diallyl 1,4,5,6,7,7-hexachlorobicyclo-(2.2.1)-5-heptene-2,3-dicarboxylate.

In order to effect the polymerization of the monomer of this invention it is generally necessary to heat in the presence of a polymerization catalyst for the purpose, and materials such as, benzoyl peroxide, acetyl peroxide, methyl ethyl ketone peroxide, lauroyl peroxide, cumene hydroperoxide, cobalt salts such as the linoleate or naphthenate, etc., may be satisfactorily employed in a proportion anywhere from about 0.01 by weight, the upper limit being conditioned by the fact that excessive amounts of catalyst over that required serve no useful purpose in the polymerization. Alternatively, the monomer may be polymerized by other methods generally employed for the polymerization of diallyl resins, for example, by exposure to ultraviolet light.

The following examples illustrate the polymerization of the monomer of this invention and some of the properties of the polymers resulting therefrom and reinforced plastic articles thereof.

*Example 5*

A sample of the diallyl 1,4,5,6,7,7-hexachlorobicyclo-(2.2.1)-5-heptene-2,3-dicarboxylate prepared in accordance with Example 3 was polymerized in the presence of 0.5 percent of benzoyl peroxide by heating to a temperature of 80 degrees centigrade for a period of four hours. The homo-polymer produced was a hard, transparent, infusible, insoluble resin having a chlorine content of 45.4 percent by weight and a specific gravity at 25 degrees centigrade/15.5 degrees centigrade of 1.601. The polymerized resin was flame resistant as evidenced by its self-extinguishing characteristics on removal from an oxidizing flame. After being heat aged for three days at 200 degrees centigrade, the resin had a crushing strength of 1,300 pounds and after one week, its crushing strength was 23,000 pounds, determined on a cylindrical casting 1⅛ inches in diameter and one inch long. After the one week aging period at the temperature of 200 degrees centigrade, the percent weight loss of the resin was measured and found to be only one-half percent by weight. Another sample of the resin was found to have a 7.4 percent shrinkage in volume when fully cured in the presence of one percent benzoyl peroxide at a temperature of 100 degrees centigrade for a period of about one-quarter hour. Various samples of the polymerized resin were tested and found to withstand immersion for a one week period in distilled water, 10 percent hydrogen chloride solution and transformer oil without any change in weight or linear dimensions. After immersion for one week in gasoline only a one-half percent decrease in weight was observed. A different sample of the resin having a 45.4 percent by weight chlorine content was heat aged for one week at a temperature of 200 degrees centigrade after which time the chlorine content was again measured and found to be 45.2 percent by weight.

*Example 6*

Monomeric diallyl 1,4,5,6,7,7 - hexachlorobicyclo - (2.2.1)-5-heptene-2,3-dicarboxylate prepared after the manner of the foregoing examples was mixed with one percent by weight of benzoyl peroxide polymerization catalyst and made up into a three ply fiber glass mat laminate, two inches by two inches square, and having a resin content of about 50 percent by weight. The laminate was cured by sandwiching between glass plates at a temperature of about 130 degrees centigrade for a period of 20 minutes. Another sample of the resin was mixed with one percent by weight of benzoyl peroxide and made up into a six ply laminate on asbestos paper and was cured at a temperature of 140 degrees centigrade under a pressure of nine pounds per square inch within a period of 12 minutes. The laminates so produced had a pleasing appearance and withstood repeated blows from a hammer without breaking when supported on their edges.

The polymerizable composition of this invention has a wide variety of applications in the art. For example, with or without a filler it may be used in the production of molding compositions and molded articles; in the presence of a foaming agent it may be made into foamed articles; and, it is particularly useful as a binder for the production of laminated articles, as illustrated among the foregoing examples. The reinforcing medium for the laminate may be fiber glass mat or shredded glass fibers, paper, cloth, leather, etc. Inert fillers such as dyes, pigments, asbestos, wood flour, abrasive granules, mica dust, clay, sand, etc., may be mixed with the monomer of this invention to form molding compositions which are polymerizable into useful articles of commerce in the presence of a polymerization catalyst.

In addition, the monomeric compound of this invention is particularly useful as a cross-linking agent for setting unsaturated linear polyester resins which are soluble and fusible into the infusible and insoluble cross-linked state.

It is apparent from a consideration of the foregoing

I claim:

1. Diallyl 1,4,5,6,7,7-hexachlorobicyclo-(2.2.1)-5-heptene-2,3-dicarboxylate.

2. A resinous polymer of diallyl 1,4,5,6,7,7-hexachlorobicyclo-(2.2.1)-5-heptene-2,3-dicarboxylate.

3. The process for producing dialkyl 1,4,5,6,7,7-hexachlorobicyclo-(2.2.1)-5-heptene-2,3-dicarboxylate which comprises reacting 1,4,5,6,7,7-hexachlorobicyclo-(2.2.1)-5-heptene-2,3-dicarboxylic acid anhydride with at least two molecular equivalents of allyl alcohol in the presence of a solvent.

4. The process for producing diallyl 1,4,5,6,7,7-hexachlorobicyclo-(2.2.1)-5-heptene-2,3-dicarboxylate which comprises reacting dimethyl 1,4,5,6,7,7-hexachlorobicyclo-(2.2.1)-5-heptene-2,3-dicarboxylate with allyl alcohol in the presence of an ester interchange catalyst.

5. The process for producing diallyl 1,4,5,6,7,7-hexachlorobicyclo-(2.1.1)-5-heptene-2,3-dicarboxylate which comprises reacting a compound selected from the group consisting of 1,4,5,6,7,7-hexachlorobicyclo-(2.2.1)-5-heptene-2,3-dicarboxylic acid, 1,4,5,6,7,7-hexachlorobicyclo-(2.2.1)-5-heptene-2,3-dicarboxylic acid anhydride and dimethyl 1,4,5,6,7,7-hexachlorobicyclo-(2.2.1) - 5 - heptene-2,3-dicarboxylate, with allyl alcohol.

References Cited in the file of this patent

UNITED STATES PATENTS

| | | |
|---|---|---|
| 2,218,439 | Rothrock | Oct. 15, 1940 |
| 2,221,663 | Rothrock | Nov. 12, 1940 |
| 2,445,627 | Morris et al. | July 20, 1948 |
| 2,537,845 | Morris et al. | Jan. 9, 1951 |
| 2,606,910 | Herzfeld et al. | Aug. 12, 1952 |

UNITED STATES PATENT OFFICE
Certificate of Correction

Patent No. 2,810,712 October 22, 1957

Charles F. Baranauckas

It is hereby certified that error appears in the printed specification of the above numbered patent requiring correction and that the said Letters Patent should read as corrected below.

Column 1, line 36, for "clo-(2.2.1)-heptene-2,3-" read —clo-(2.2.1)-5-heptene-2,3- —; same column, lines 39 to 43 inclusive, the equation should appear as shown below instead of as in the patent—

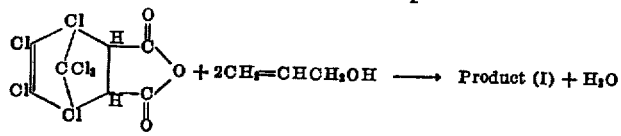

Signed and sealed this 18th day of February 1958.

[SEAL]

Attest:
KARL H. AXLINE,
*Attesting Officer.*

ROBERT C. WATSON,
*Commissioner of Patents.*